United States Patent

[11] 3,559,699

| [72] | Inventor | Hans Droell<br>Bergen-Enkheim, Germany |
|---|---|---|
| [21] | Appl. No. | 750,930 |
| [22] | Filed | Aug. 7, 1968 |
| [45] | Patented | Feb. 2, 1971 |
| [73] | Assignee | Balzer & Droll KG<br>Rosenhelle, Germany |
| [32] | Priority | Aug. 9, 1967 |
| [33] | | Germany |
| [31] | | 1,613,021 |

[54] METHOD AND APPARATUS FOR WINDING OF STATOR FOR ELECTRIC MACHINES
19 Claims, 2 Drawing Figs.

[52] U.S. Cl. .................................................. 140/92.1,
29/205
[51] Int. Cl. .................................................. B21f 3/00
[50] Field of Search .......................................... 140/92.1,
92.2; 29/205

[56] References Cited
UNITED STATES PATENTS
| 2,479,391 | 8/1946 | Miller .......................... | 140/92.2 |
| 3,415,292 | 12/1968 | Ericson ........................ | 140/92.1 |

*Primary Examiner*—Lowell A. Larson
*Attorney*—Larson, Taylor & Hinds

ABSTRACT: An arrangement for winding coils for stators including a winding drum driving mechanism and a template carrier mechanism, the latter including a multisided rotatable housing having a set of templates on each lateral surface. The templates of each set are movable radially outwardly for alignment with corresponding winding funnels and radially inwardly for simultaneous removal of all coils; and the housing is rotatable to position successive sets of templates for receiving coils while already wound coils are being removed.

Inventor:
HANS DROLL

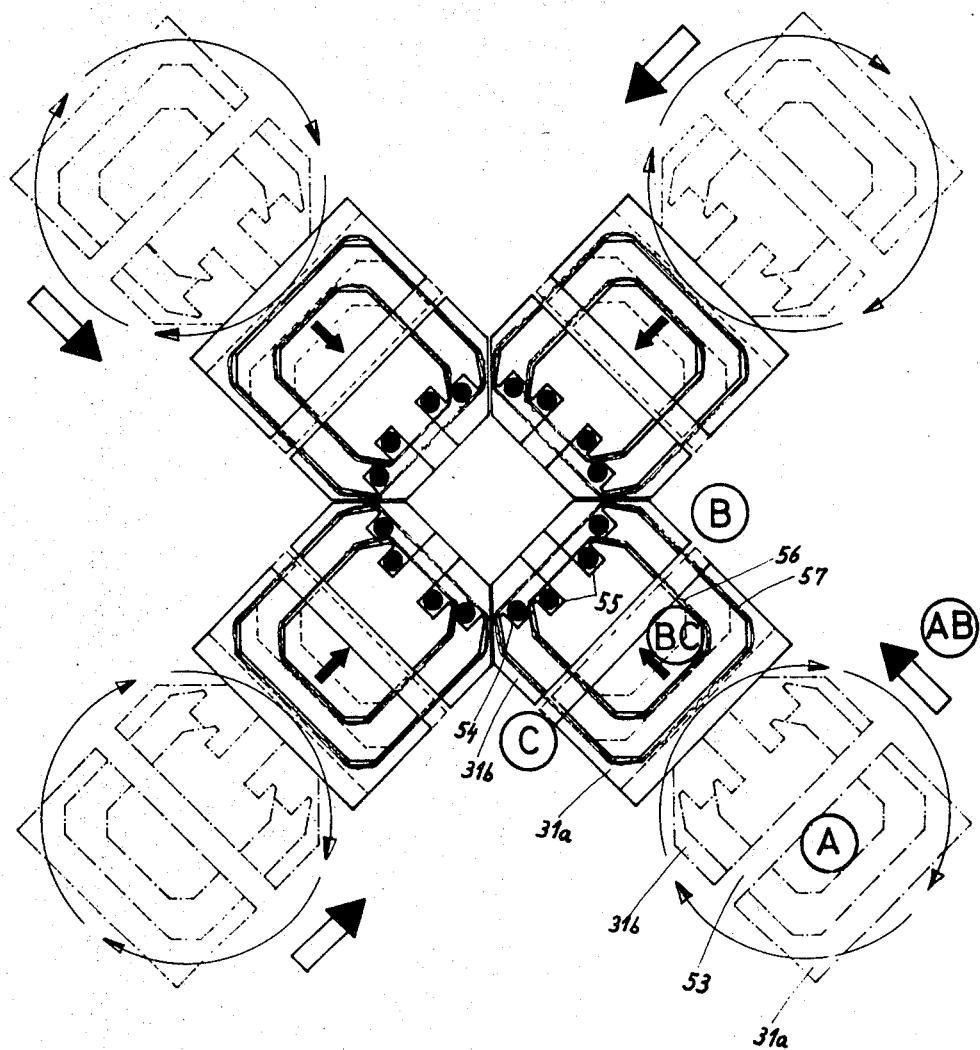

3,559,699

METHOD AND APPARATUS FOR WINDING OF STATOR FOR ELECTRIC MACHINES

BACKGROUND OF THE INVENTION

1. Field of the Invention

The invention concerns a method and apparatus for the winding of stators of electric machines, whereby wire coils are wound individually or in groups for multipole winding onto templates and are then removed and are threaded together into the grooves of the stators.

2. Description of the Prior Art

It has been known to wind the stators of electric machines on automatic devices, which thread the winding during the winding process directly into the grooves of the stators. Because at the same time the wire must be carefully guided in a straight line through the grooves of the stator, and then bent before passing over the front sides of the stator, the attainable winding speed is severely limited.

Thus, high speeds of winding were then achieved by producing the coils outside the stator in a known manner by means of rapidly rotating winding funnels on templates. Of course with this procedure an additional work process is necessary to insert the finished coils into the grooves of the stator. Unfortunately, heretofore, the work processes following the winding procedure prevented a full utilization of the high winding speed. It was necessary to pull off the coils from the templates individually and to thread them individually into the stator grooves. It is true that a certain increase in production was achieved through the use of a transfer member having a circular tongue capable of receiving coils of a layer of coils and transferring them to the treading device. However even with this procedure, it was still necessary to remove the wound coils individually which had to be manipulated into position for removal of each coil.

SUMMARY OF THE INVENTION

Thus it is a purpose of the invention to eliminate the previously mentioned disadvantage and to create a method and an apparatus with which it will be possible to achieve an essential saving in time as compared to the known production procedures for the winding of stators.

The purpose of the invention is achieved through the fact that all coils of a layer of the stator are wound simultaneously onto several templates and are removed together from said templates.

A preferred arrangement for carrying out the invention comprises a winding device with synchronous drive of several winding drums arranged star-shaped around a central axis and of a template carrier with several templates each of which is movable radially in relation to a central axis and arranged star-shaped about said axis in a corresponding manner, whereby said templates assume a position in their radial outer position corresponding to the arrangement of the winding drums, and carry coils that are to be threaded into the grooves of the stators at a reciprocal distance required for the common process of threading in. This arrangement can be developed, for practical purposes, in such a sense that the template carrier has a plurality of lateral surfaces and is turnable around a longitudinal axis, whereby its lateral surfaces can be moved one after the other into a position opposing the winding drums, and in that the each lateral surfaces has a set of templates formed thereon. With this arrangement it is possible to simultaneously cover the templates on one lateral surface of the template carrier with coils while simultaneously removing already completely wound coils from the templates from another lateral surface, as a result of which an additional time saving in time will be achieved.

Thus it is an object of this invention to provide a new and improved arrangement for winding stator coils.

It is another object of this invention to provide a new and improved method and apparatus for winding stator coils wherein wound coils may be simultaneously removed as new coils are being wound.

It is another object of this invention to provide a new and improved method and apparatus for winding stator coils wherein wound coils may be simultaneously removed as new coils are being wound including at least one set of templates capable of radial movement between an outer winding position and an inner removing position.

Other objects and the attendant advantages of the invention will become apparent from the detailed description to follow.

BRIEF DESCRIPTION OF THE DRAWINGS

A preferred embodiment of the invention is explained in more detail below with respect to the accompanying drawings.

FIG. 2 shows a schematic presentation of the course of movement of a set of templates on which coils are wound on one lateral surface of the template carrier of the device according to FIG. 1.

DETAILED DESCRIPTION OF THE PREFERRED EMBODIMENT

Figure 1:
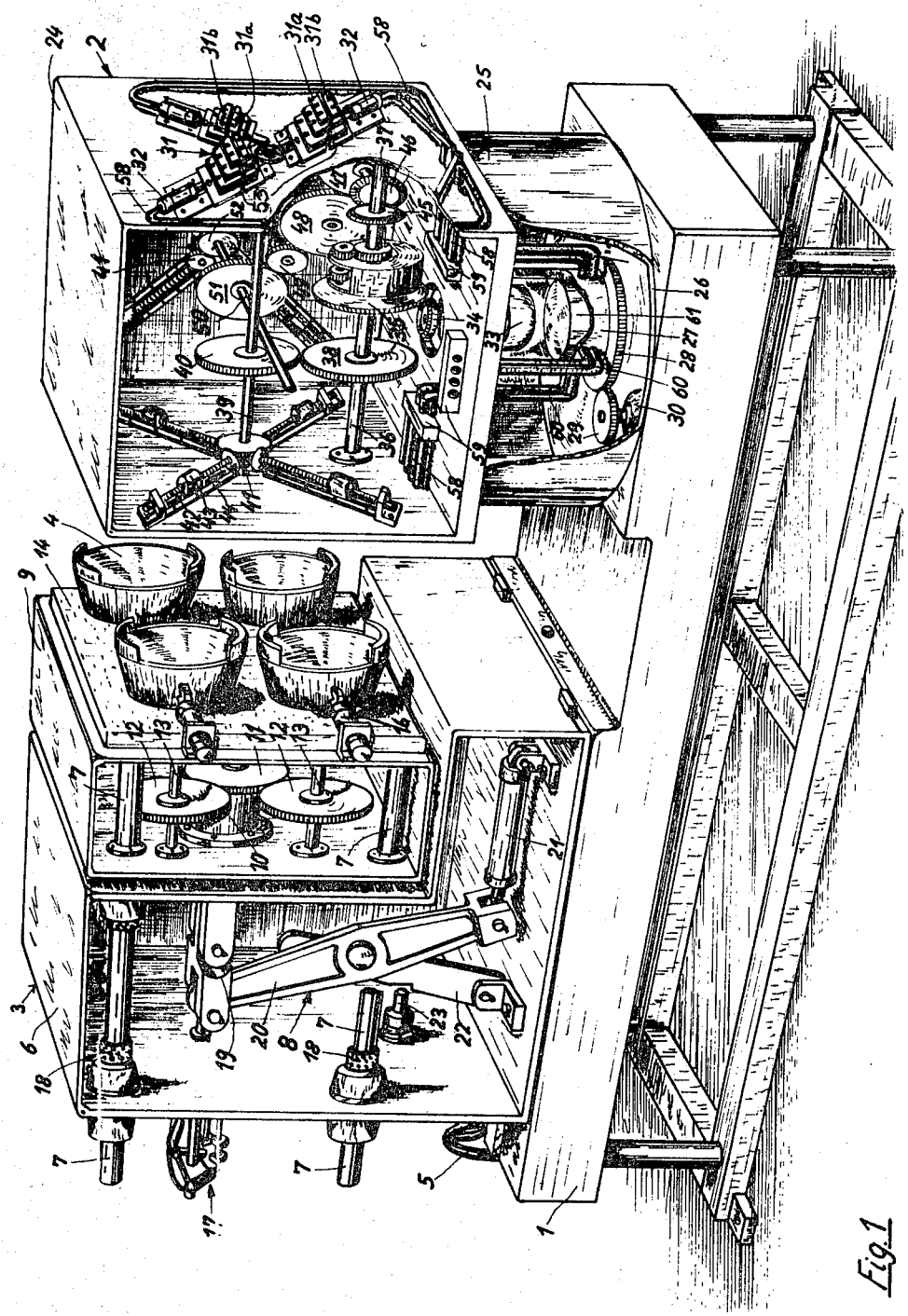
FIG. 1 shows a perspective presentation of a preferred design of an apparatus for carrying out the process according to the invention.

Referring to FIG. 1, the apparatus comprises a base support 1 on which a template carrier 2 is rotatably mounted. A driving unit 3, having several winding drums facing the template carrier 2 is also mounted on the base support 1 and is shiftable longitudinally on the base 1 towards and away from template carrier 2. The shifting of the driving unit 3 on the base support 1 is accomplished with the help of a hand wheel 5 by way of a threaded spindle (not shown).

The driving unit 3 comprises a fairly large housing 6, which contains guide bars 7 and an adjusting mechanism 8 for controlling movement of a smaller gear box 9. The gear box 9 includes a driving motor 10, which operates the four driving shafts 13 of the four winding drums 4 via a central spur gear 11 and four driving gears 12 meshing with it. Only two of the driving gears 12, and two of the driving shafts 13 are visible in FIG. 1. However the two hidden driving gears and driving shafts are arranged in the same manner, relative to their winding drums 4, as those shown in FIG. 1. The winding drums 4 are grouped about an imaginary central axis in a star-shaped arrangement on the front of a cover plate 14 of the gear box 9 facing toward the template carrier 2, and they are individually of the customary design with an outlet nozzle for the winding wire delivered by the driving shaft 13 in each case. Further, each winding drum 4 has associated therewith a suitable arresting arrangement 16 in order to control and limit the rotational speed of the drums 4.

Prior to winding of a series of coils onto the templates the entire driving unit 3 is shifted along base support 1 by means of the hand wheel 5, to the correct working position in relation to the template carrier 2. Before and after each winding procedure and also when changing over from one coil to the next in a group of coils wound onto the same template for a multipole winding, the gear box 9 is moved forward in the longitudinal direction of the base support 1 toward the template carrier 2 by means of adjusting mechanism 8 which is in turn controlled by a suitable switch as shown at 17. The gear box 9 is supported on guide bars 7 which run through bearings 18 in the housing 6. The adjusting mechanism 8 comprises a lever 20 articulated to a bracket 19 projecting from the gear box 9 into the housing 6. The opposite end of the carrier 19 is articulated to a power cylinder 21 for causing the large movements of bracket 19 such as required at the beginning and end of the winding process, and also to an intermediate lever 22 mounted articulately but fixedly on the floor of the housing 6, and operated by additional power cylinder 23, for causing smaller movements of bracket 19, such as when changing over from one coil to the next.

The template carrier 2 comprises a generally box-shaped upper part and a generally cylindrical lower part 25 which acts as a protective covering. This part is guided at its lower end in an annular groove 26 formed in the base support 1. The upper part 24 is carried by a cylinder 27 which is rotatably mounted on the base support 1 within the area of the protective covering 25 and which has connected thereto a circular gear 28. An electric motor 30 attached to base 1 acts through gear 29, which engages gear 28 to turn the template carrier 2 via the cylinder 27.

On each of the four lateral surfaces of the box-shaped upper part 24 there is provided a set of templates, each set including four templates 31, each corresponding to one of the winding drums 4. Each template is constructed in two halves 31a and 31b separated by an intermediate gap. The halves are normally urged apart by a suitable spring means inserted between the halves and they are urged together, at will, by means of hydraulic power cylinder 32. With this construction, the coils may be formed onto the templates while they are separated, after which the halves may be urged together so that the coil will sit loosely on its template thereby simplifying removal of the coil from the template.

In accordance with the present invention, each set of templates 31 on a given lateral surface of the upper part 24 is grouped about an imaginary central axis in a star-shaped arrangement corresponding to the of the winding drums 4 on the front plate 14. In the actual preferred embodiment of the invention, an identical set of templates will be provided on each of the four lateral surfaces of the box-shaped upper part 24. However, to simplify the description of the invention, the front lateral surface (that is the lateral surface facing the viewer) in FIG. 1 has been omitted. Also, one of the lower templates 31 on the right-hand side of the upper part 24 has been omitted. Further, it is to be understood that the templates on the rear and left-hand lateral surfaces, which are not visible in FIG. 1 are identical to the set of templates on the right-hand side and including, of course, the fourth template 31. It is also to be understood that the driving structure for each template located immediately inside of each lateral surface, (including elements 41 through 44) is the same for all of the templates although only one complete set of driving structure, namely the set for the templates on the left-hand lateral surface, are clearly visible in FIG. 1.

The radial movement of all templates is derived from a single motor 33 which acts through a pinion 34 to engage a differential gear indicated generally as 35. This differential gear may be shifted in a manner know per se to drive either one of the output shafts 36 or 37 while preventing rotational movement of the output shaft not being driven.

The output shaft 36 has nonrotatably attached thereto a spur gear 38 which meshes with a spur gear 40 connected nonrotatably with a shaft 39. At each of its ends (only the left-hand end being visible in FIG. 1) the shaft 39 acts through a gearing arrangement 41 to turn a spindle 42 which has threadedly mounted thereon a nut 43, such that rotational movement of the spindle 42 causes linear movement of the nut 43 towards and away from the axis of shaft 39. This nut 43 extends through an elongated slit 44 in the lateral wall of the template carrier 2 and is attached to the templates (including both halves 31a and 31b), whereby rotational movement of shaft 39 causes linear movement of the templates 31. The four templates of each set are so connected to their respective spindles 42, such that at any given moment all of the templates 31 are located the same distance from the central axis about which they are grouped. Moreover, for reasons to be explained below, the two sets of templates at opposite ends of shafts 39, that is on opposite lateral surfaces of the upper part 24, are arranged to undergo opposite movement. For example, while the templates on the left-hand lateral surface are moving radially inwardly, the templates on the right-hand lateral surface will be moving radially outwardly.

When the differential gear 35 is switched such that the output shaft 37 is driven and the output shaft 36 is blocked against rotation, this shaft 37 turns shaft 50 by the engagement of gear 45 with gear 46, by the engagement of gear 47 (which is attached to gear 46) to gear 48, and hence through meshing gears 49 and 51, wherein the shaft 50 is rigidly attached to the gear 51. This shaft 50 is operatively connected to the templates on the front and rear lateral surfaces of the upper part 24. However, since the front set of templates is not shown in FIG. 1 the shaft 50 is indicated as broken at a point intermediate its length. Since, in the present embodiment, the two main drive shafts 39 and 50 cross each other, one of the shafts must be located below the other. On the other hand, the center of all four sets of templates must be located at the same horizontal level so that the templates are properly aligned relative to the winding drums 4. For this purpose an intermediate gear 52 is provided between the two opposite ends of shaft 50 and the corresponding gears 41 associated with the spindles 42 on the front and rear lateral surfaces of the upper part 24.

The operation of the invention will now be described with respect to FIGS. 1 and 2. In FIG. 1, each template is illustrated as having three separate levels for receiving three separate groups of coaxial coils. However, for simplicity, only two of these levels are shown in FIG. 2, namely a level for coil 56 and a level for coil 57. Assume now that one set of templates has just been completely covered. That is, assume that each of the four templates of a set has just received from its corresponding winding funnel 4 a pair of coils 56 and 57; and further assume that the gear box 9 has been shifted longitudinally by means of adjusting mechanism 8 away from the template carrier 2, that the wires have been cut with a suitable device (not shown). The wound coil will be assumed to be the left lateral surface in FIG. 1. The template carrier is now turned 90° so that the set of templates containing the coils now faces the front. During the winding process it was necessary that the templates be located in their radial outward position (by virtue of their connection to nuts 43) so that each template carrier would be aligned with its respective winding drum 4. The outer positions of the templates are shown in FIG. 2 in phantom line and indicated by the letter A. The circular arrows drawn in FIG. 2 symbolizes the rotative movement of the winding drums. It is evident that during the winding process the templates are separated a considerable distance from each other thereby eliminating the possibility of entanglement between the coils of adjacent templates. Moreover, during the winding procedure the halves 31a and 31b are spread apart by suitable spring means. At this time, of course, the power cylinder 32 offer no resistance to the spreading force of the springs.

After the completion of the winding process and after the electric motor 30 has been operated to turn the template carrier 90° (counterclockwise when viewed from above), the wound coils face front. The lateral surfaces now facing forwardly and rearwardly are those associated with shafts 36 and 39. Suitable switching means now switch the differential gear 35 so that power runs from the output shaft 36 to the gear shaft 39 while output shaft 37 is prevented from rotating. Motor 33 is now switched on so that power is transmitted to rotate the shaft 39. As explained earlier, the spindles 42 on opposite lateral surfaces are arranged to move in opposite directions. Thus, turning movement of shaft 39 now moves the templates 31 containing the wound coils thereon radially inwardly, as shown in dotted lines in FIG. 2. Meanwhile, this same turning movement causes the templates on the rear lateral surface to move their radial outward position so that they will be in the correct radial position to be aligned with the funnels 4 after the template carrier 2 is turned another 90° at which time those templates now located on the rear lateral surface will face the winding drum 4.

As the templates 31 are moved inwardly, the halves 31a and 31b still remain spread apart so that the coils are held tightly. At this time a transfer member having a plurality of parallel bars (shown in cross section as elements 54 in FIG. 2) engages the coils by the insertion of the bars into grooves 55 formed in the inside template halves 31b, on the surface thereof facing the imaginery central axis about which the templates are arranged. The grooves on the smaller level of the template (the level containing coil 56) are deeper than those on the other level of the template containing coil 57. With this construction it is possible for the circular bars 54 to be placed immediately inside of the coil 56 as well as the coil 57. Suitable means may be provided for clamping the coils against the bars 54. At this time the four outer halves 31a are urged against their respective inner halves 31b by supplying pressure to hydraulic power cylinders 32 in an amount sufficient to overcome the spring force acting to separate the halves. This position of the template halves is shown in dotted lines in FIG. 2 and indicated by the letter C. The inward movement of the half 31a is indicated by the arrow BC in FIG. 2. The power cylinders 32 receive their hydraulic fluid through delivery lines 58, distributors 59 and lines 60. Each lateral surface includes its set of elements 58—60. However, to assure that only those templates carrying the wound coils are urged together, a fixed piston 61 mounted within the cylinder 27, rotates with the template carrier 2 and acts as a valve body for supplying pressurized fluid only to that side of the piston 61 which is located in the front (as viewed in FIG. 1). Of course additional control means would be necessary to assure that the halves were urged together only at the appropriate moment. Thus, with an automatic operation the additional control would assure that the pressure from piston 61 would not cause movement of the template halves until after the bars 54 had been moved into the grooves 55 and the coils had been clamped thereagainst. In nonautomatic operation a controllable switch, such as a foot operated pedal or the like, could be provided so that the operator could move the template halves together at will.

Concurrent with the removal of the wound coils, as described above with respect to FIG. 2, that set of templates which, at the time were facing the winding drums 4, were having wound thereon another set of coils. The template carrier is again turned 90° (counterclockwise when viewed from above) by operation of motor 30. The differential gear 35 is now connected to the drive output shaft 37 while preventing rotative movement of shaft 36. Motor 33 now acts through differential gear 35 to turn shaft 37 and finally shaft 50. In this manner the newly wound set of coils is removed in exactly the same manner as described above with respect to FIG. 2.

Meanwhile, the set of templates containing the first group of coils to be removed have now moved to the right-hand side of template carrier 2. As can be seen in FIG. 1, at this position the templates remain in their radial inward position where they will remain until they are moved to the rear lateral surface at which time they will be moved outwardly when the templates on the opposite lateral surface are moved inwardly for the purpose of removing coils from those templates on the said opposite lateral surface. Those templates will then be in the proper position to be aligned with their corresponding winding drums 4 after the template carrier 2 is again turned 90°.

Although the invention has been described in considerable detail with respect to a preferred embodiment thereof, it should be apparent that the invention is capable of numerous modifications and variations apparent to those skilled in the art without departing from the spirit and scope of the invention.

I claim:

1. An apparatus for producing a plurality of wire coils for the stator of a multipole electrical machine comprising: a supply carrier comprising a plurality of wire supply devices for delivering wire to be coiled, the said supply devices being arranged about a supply carrier axis, a template carrier having at least one set of templates positioned to cooperate with said supply carrier for receiving wire therefrom for forming wire coils, said set comprising a plurality of templates arranged about a template carrier axis, each template of the set corresponding to one of said supply devices, and including means for moving each template of the set radially towards and away from the carrier axis at least between a radial outer position and a radial inner position, wherein at their radial outer positions the templates are in position to receive wire from their respective supply devices for forming a wire coil thereon, and wherein at their radial inner positions the templates are in position for the coils wound thereon to be simultaneously removed from their respective templates.

2. The apparatus according to claim 1 wherein each of said supply devices comprises a rotatable supply member mounted for rotation about an axis, and including drive means for rotating all of said supply members in synchronism with each other.

3. The apparatus according to claim 2 wherein the rotational axes of said supply members are substantially parallel to said supply axis, and wherein said supply carrier and said template carrier are mounted on a common base support such that the said set of templates and the said supply members face each other so that each template faces its corresponding supply members and including means for moving the supply carrier towards and away from the template carrier.

4. The apparatus according to claim 2 wherein said drive means for the rotatable supply members and the means for moving the supply carrier comprise power operated means mounted on the said base support.

5. The apparatus according to claim 1 wherein said template carrier comprises a housing mounted for rotation about a longitudinal axis substantially perpendicular to said supply carrier axis, said housing having a plurality of lateral surfaces, each surface having mounted thereon a set of templates, whereby, by turning said housing about its longitudinal axis each of said sets of templates are successively brought to the position to face and cooperate with the supply carrier.

6. The apparatus according to claim 5 wherein the template carrier has four said lateral surfaces forming a four sided housing of rectangular cross section, and including means for rotating the housing about its longitudinal axis by 90° increments, and means for controlling the radial movement of the templates in response to the rotative position of the said housing.

7. The apparatus according to claim 6 wherein the means for moving the templates includes means for moving the templates on opposite lateral surfaces of the housing in synchronism with each other but in the opposite radial directions such that when the templates of one set are moving radially inwardly the templates of the opposite set are moving radially outwardly.

8. The apparatus according to claim 7 including a common drive means for all four sets of templates, first shaft means operatively connected to one pair of opposite set of templates and a second shaft means operatively connected to the other pair of opposite sets of templates and differential means for selectively connecting said common drive means to either one of said first or second shaft means.

9. The apparatus according to claim 8 wherein said common drive means is arranged to be connected, through said differential means, to only that shaft means of which the opposite sets of templates do not at the moment face and cooperate with the said supply carrier.

10. The apparatus according to claim 9 wherein each of said supply devices comprises a rotatable supply member mounted for rotation about an axis, and including drive means for rotating all of said supply members in synchronism with each other.

11. The apparatus according to claim 10 wherein the rotational axes of said supply members are substantially parallel to each other, and wherein said supply carrier and said template carrier are mounted on a common base support such that the said set of templates and the said supply members face each other so that each template faces its corresponding supply member, and including means for moving the supply carrier towards and away from the template carrier.

12. The apparatus according to claim 11 wherein said drive means for the rotatable supply members and the means for moving the supply carrier comprise power operated means mounted on the said base support.

13. The apparatus according to claim 9 wherein each template is divided into two portions which are urged a predetermined distance away from each other at least when the set, of which that template is a part, is in the operative position facing the supply carrier.

14. The apparatus according to claim 9 wherein the edges of the templates facing the template carrier axis includes a plurality of grooves constructed and arranged of varying depths such that when the templates are moved to the said radial inner position the grooves define a circular path about the template carrier axis for receiving a transfer member which includes a plurality of parallel bars arranged on a circular path about the template carrier axis.

15. The apparatus according to claim 1 wherein each template is divided into two portions which are urged a predetermined distance away from each other at least when the set, of which that template is a part, is in the operative position facing the supply carrier.

16. The apparatus according to claim 15 including means for urging the said two portions together to facilitate removal of a wound coil from a template after the set, of which that template is a part, has moved away from the said operative position facing the supply carrier.

17. The apparatus according to claim 16 wherein the last said means comprises a fluid operated piston and cylinder unit, and wherein said template carrier comprises a housing rotatable about a longitudinal axis perpendicular to the supply carrier axis, and including a plurality of lateral sides, one set of templates being mounted on each lateral side, and including a valve means operable in response to movement of the housing about the longitudinal axis, for controlling the piston and cylinder units.

18. The apparatus according to claim 1 wherein the edges of the template facing the template carrier axis includes a plurality of grooves constructed and arranged of varying depths such that when the templates are moved to the said radial inner position the grooves define a circular path about the template carrier axis for receiving a transfer member which includes a plurality of parallel bars arranged on a circular path about the template carrier axis.

19. In the method for producing a plurality of wire coils for the stator grooves of a multipole electrical machine wherein the coils are wound separately from the stator grooves, the improvement including the steps of:

simultaneously winding all coils of a layer of coils each from a separate supply device onto a separate template, as the templates are located in a winding position spaced apart from each other with the axes of the coils substantially parallel to each other; and with the coils wound on the templates, moving the templates to a removing position at which the said axes are still substantially parallel to each other and wherein the templates are closer to each other than in said winding position, and then simultaneously removing all coils of the layer from the templates by simultaneously transferring them onto a set of transfer bars, and then threading the coils together into the stator grooves.